Sept. 17, 1968 R. WASYLUK 3,402,372

PASSIVE ELECTRIC NETWORK

Original Filed April 11, 1962 3 Sheets-Sheet 1

INVENTOR.
Rostislav Wasyluk
BY
Richard Ernst
Ag't

Sept. 17, 1968 R. WASYLUK 3,402,372

PASSIVE ELECTRIC NETWORK

Original Filed April 11, 1962 3 Sheets-Sheet 2

INVENTOR.
Rostislav Wasyluk
BY
Richard ... Ag't

PASSIVE ELECTRIC NETWORK

Original Filed April 11, 1962

INVENTOR.
Rostislav Wasyluk
BY
Richard Lind
Ag't

United States Patent Office 3,402,372

Patented Sept. 17, 1968

3,402,372
PASSIVE ELECTRIC NETWORK

Rostislav Wasyluk, Prague, Czechoslovakia, assignor to Tesla, narodni podnik, Prague, Czechoslovakia Original application Apr. 11, 1962, Ser. No. 186,737, now Patent No. 3,289,276, dated Dec. 6, 1966. Divided and this application Sept. 8, 1966, Ser. No. 577,947

Claims priority, application Czechoslovakia, Apr. 21, 1961, 2,473/61

3 Claims. (Cl. 333—70)

ABSTRACT OF THE DISCLOSURE

Complex networks of resistors and capacitors are replaced by bodies of dielectric materials having dielectric loss factors greater than 0.1, juxtaposed in layers having flat surfaces and provided with conductive coatings in the flat layer surface for contact with corresponding conductive coatings in another similar layer in which the individual bodies of dielectric material may be differently arranged.

Figure 1:
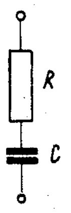

This application is a division of application Ser. No. 186,737, filed Apr. 11, 1962, now Patent No. 3,289,276.

This invention relates to electrical circuits and more particularly to such circuits containing resistances and capacitances of desired values and combinations and optionally, but not necessarily, also inductances and semiconductors.

Electrical circuits containing resistances and capacities of desired values according to predetermined circuit schemes are produced in a wide range of combinations in many branches of electrical engineering, electronics, computing techniques, etc. The most common manner of producing such circuits is to select single circuit elements as indicated in the circuit scheme, that means resistors, capacitors, coils, etc. and to join them electrically as indicated in the circuit scheme, for instance, by cabling, by direct soldering, etc. One of the important trends of modern electrical engineering is to minimize the dimensions of such circuits. Several methods have been proposed for replacing certain combinations of circuit elements by single units of smaller size. For instance, it is known to produce miniature circuit components in such a manner that a body made of insulating material bears on one of its surfaces a film made of a resistance material and on its opposite side a film made of a conductive material, such body having the properties of a combination of a capacity and a resistance. The disadvantage of this method is that it is necessary to apply thin films to the body from two opposite sides, which process is comparatively complicated and expensive. Moreover, such bodies can replace only a simple series combination of a resistor and a capacitor, being unable to replace other combinations which may be desirable in building-up electric circuits according to predetermined schemes.

It is also known to superimpose different materials and to utilize the different properties of such materials in order to obtain in the interior of one or more of them or on their contacting surfaces certain desired electrical effects. Such combinations, sometimes called "function blocks," are known in different arrangements. It is, for instance, known that for some parameters a combination of a resistor and a capacitor may be replaced by a combination of two superimposed bodies with different specific resistances. The contacting surface of such bodies shows a capacitive effect so that the combination of the two bodies forms an RC-member. Another known function block consists of three superimposed layers of different materials selected in such a manner that the first layer consists of a resistance material, the second layer consists of an electrically insulating material not being, however, a thermal insulator, and the third layer is made of thermoelectric material. Alternating current is supplied to the first layer, thereby heating the material of this layer. The developing heat passes through the second layer into the third layer where a direct voltage is produced by Seebeck effect owing to the heating of this layer. This known function block may serve therefore as a rectifier.

The object of the invention is to reduce the dimensions of electric circuits and thus to reduce also the production costs of electric devices.

An electric circuit made according to the invention replaces at least one desired combination of one or more resistances and one or more capacitors by a solid body made of a single dielectric material whose loss factor is greater than 0.1, the properties of the dielectric material and the shape of it being chosen so as to satisfy predetermined relations in respect to the values of the resistances and the capacities of the desired combination.

The term "dielectric material" is to be understood to denote materials whose electrical conductivity is smaller or at most equal to $10^{-1}$ ohm$^{-1}$cm.$^{-1}$.

The term "loss factor" denotes the tangent of the dielectric loss angle of the respective material.

The properties of the dielectric material which must be chosen suitably to satisfy predetermined relations in respect to the values of the resistances and capacities of the desired combinations are:

Optical permittivity, $e_r$, that means the asymptotic value of permittivity in an alternating field of infinitely great frequency, practically for optical frequencies.

Statical permittivity $e_s$, that means the dielectric constant of the material measured for direct voltage.

Optical conductivity $g_r$, that means the asymptotic value of electrical conductivity for a current of infinitely high frequency, practically for optical frequencies.

Electrical conductivity $g_s$, that means conductivity of the material for direct current.

Relaxation time $t$ of the dipoles of the material, that means the time-constant of the return of molecular dipoles of the respective material to their rest position after the removal of the external electric field.

The predetermined relations which are to be satisfied by the properties and by the shape of the dielectric body are different for different combinations of resistances and capacities which are to be replaced according to the invention by a single body of dielectric material. Details are given below with reference to the accompanying drawings. However, in each case an electric circuit or network made in accordance with the present invention is formed by a method which comprises two steps, the first being the choice of a suitable dielectric material and the second being the shaping of this material into a body of suitable dimensions, both the properties and the shape being determined by mathematical formulae depending on the various combinations covered by the invention.

It is to be stressed that the invention differs from the known devices cited above in that simple or more complicated combinations of resistances and capacities are replaced according to the invention by a single, homogeneous body made of a single dielectric material whereas the known devices use at least two bodies of different materials in order to achieve the same effect.

Although the main feature of the invention resides in replacing a combination of resistances and capacities by a body made of a single dielectric material, it is possible to replace in a given circuit not only one such combination but also several combinations in said manner. In such cases each of these combinations is replaced by a body of a single dielectric material with a loss factor greater than 0.1 but the dielectric material which replaces one combination may be different from the dielectric material replacing another combination.

According to a further feature of the invention, the solid bodies of dielectric materials may be placed in a magnetic field generated by one or several induction elements.

The novel electric circuit may be arranged in such a manner that the bodies of dielectric materials with a loss factor greater than 0.1 have the shape of flat plates, prisms, cylinders or cylindrical sectors, the opposite surfaces of these bodies being provided with conductive coatings and the bodies being electrically connected with each other by contact with said coatings. The conductive coatings need not cover the whole area of the opposite surfaces of the bodies but may occupy only a portion of these surfaces. The conductive coatings of the bodies may be also permanently joined together, for instance by soldering.

In addition to bodies made of dielectric materials with a loss factor greater than 0.1, the circuits may comprise also other bodies, for instance, bodies of dielectric materials whose loss factor is equal to or smaller than 0.1, and/or bodies made of resistance materials, and/or semiconductors, and/or resistance materials. Also such bodies may be provided on their opposite surfaces with electrically conductive coatings and may be connected with each other directly by these coatings.

The bodies of dielectric materials and/or of semiconductors and/or of resistance materials, provided with conductive coatings on their opposite surfaces, may be laid side by side and over each other in several layers. The bodies superimposed in different layers may have areas of the same shape or of different shapes partly overlapping each other.

Figure 9:
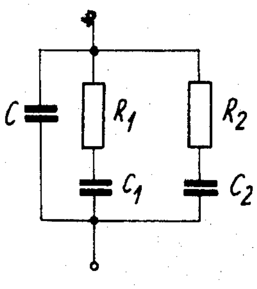
Figure 10:
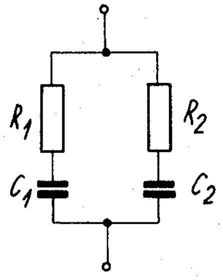
Figure 11:
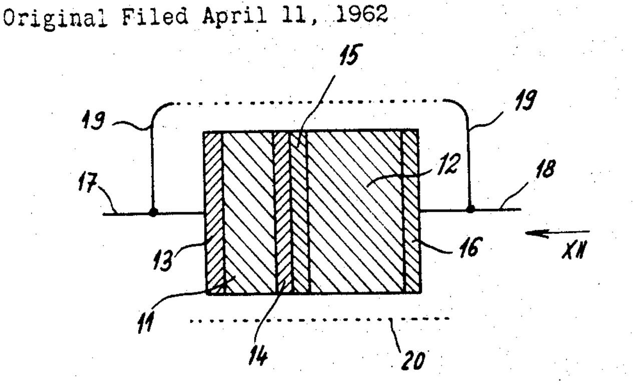
Figure 12:
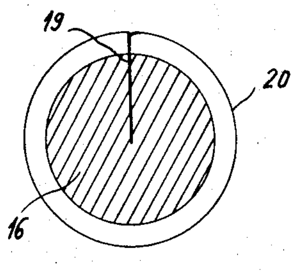
Figure 13:
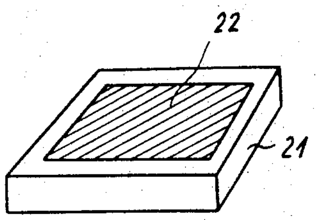
Figure 14:
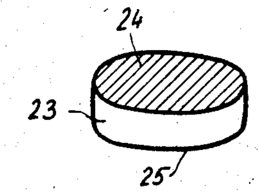
Figure 15:
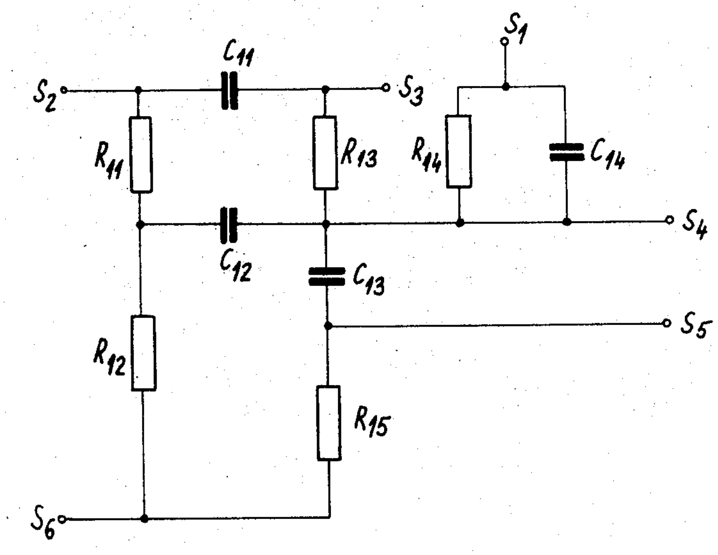
Figure 16:
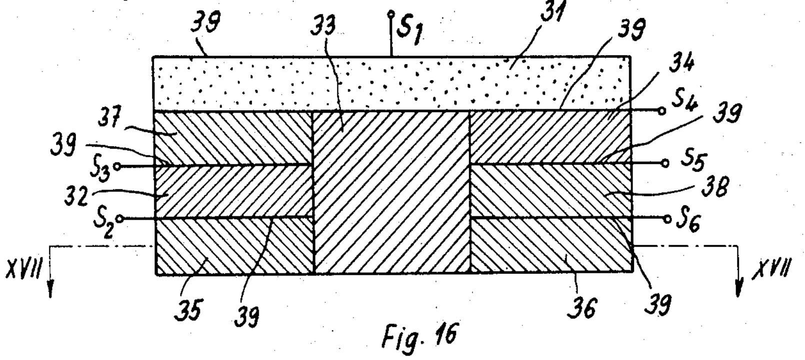
Figure 17:
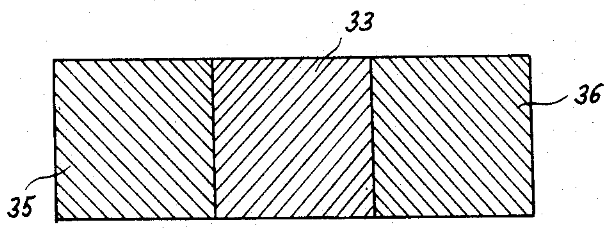
Figure 18:
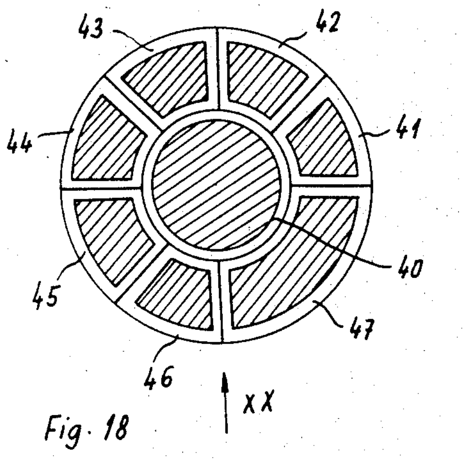
Figure 19:
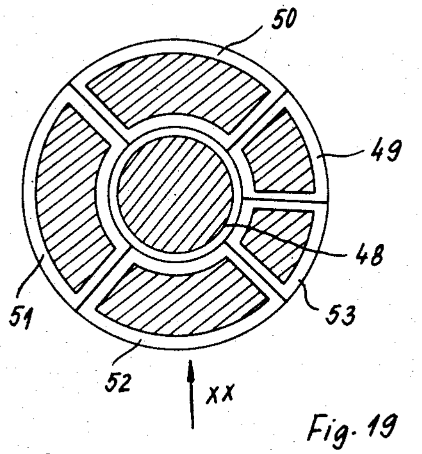
Figure 20:
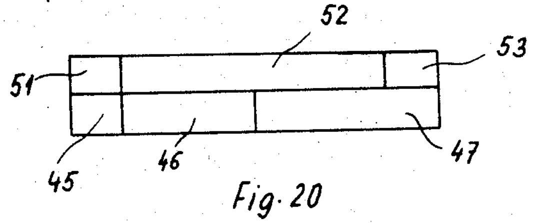

Other features and details of the invention will now be explained in detail with reference to the accompanying drawings, in which:

FIGS. 1 to 10 show different combinations of resistors and capacitors which may be replaced according to the invention by respective bodies of dielectric material with a loss factor greater than 0.1, FIG. 11 shows in longitudinal section a circuit element according to the invention, FIG. 12 shows the same element as viewed in the direction of the arrow XII in FIG. 11, FIG. 13 is a perspective view of a circuit element according to the invention with conductive coatings, FIG. 14 shows another circuit element according to the invention, FIG. 15 shows a circuit diagram of a more complicated electrical circuit which may be replaced by superimposed circuit elements according to the invention, FIG. 16 is a cross-sectional view of the assembly replacing the circuit shown in FIG. 15, FIG. 17 is a sectional view of the assembly shown in FIG. 16, taken on the line XVII—XVII, FIG. 18 is a top view of one layer of circuit elements in an assembly according to the invention, FIG. 19 shows another layer of the same assembly, and FIG. 20 shows the two layers in a view of the assembly taken in the direction of the arrow XX in FIGS. 18 and 19.

FIG. 1 shows a series combination of a resistor R and a capacitor C. In accordance with the invention this combination is replaced by a solid body made of a single dielectric material whose loss factor is greater than 0.1. The body consists of a dielectric material whose electrical conductivity $g_s$, optical permittivity $e_r$, statical permittivity $e_s$, and relaxation time $t$ of its dipoles satisfy the conditions $g_s \leq 10^{-10}$ ohm$^{-1}$cm.$^{-1}$, $$\frac{e_s}{e_r} \geq 1000,\ t = R \cdot C$$

and $$t \leq \frac{1}{2\pi f_m} \cdot \sqrt{\frac{1}{100}\left(\frac{e_s}{e_r}\right)^2 - 1}$$

where $f_m$ is the highest frequency for which the circuit is to be used, and the thickness A of the body, measured in the direction of the electric field to be applied to it, and the cross-sectional area S of the body measured perpendicularly to the aforesaid direction satisfy the condition $$S = A \cdot \frac{C}{e_s}$$

As it may be seen from the last formula, one of the values A or S may be chosen arbitrarily, whereupon the other value must be chosen so as to satisfy the equation $$S = A \cdot \frac{C}{e_s}$$

In practice, it is convenient to choose the value of A as small as possible in view of the mechanical strength of the material, whereupon the value of S is calculated from the equation. The same remark applies also to all subsequent examples given below.

For instance, the desired value may be $R = 25$ kilohms, and $C = 40$ nanofarads. Such series circuit elements are used in so-called physiological volume controls of radio receivers, the maximum used frequency being $f_m = 12$ kc./s. According to the invention, the combination may be replaced by a single body of dielectric material, for instance, of barium titanate, having the following properties: $e_s = 10000\ e_o$, $e_r = 9.6\ e_o$, $t = 10^{-3}$ sec., $g_s = 10^{-10}$ ohm$^{-1}$cm.$^{-1}$, so that the relaxation time $t$ satisfies the inequality $t < 1.38 \times 10^{-3}$ sec. for $f_m = 12$ kc./s. Such materials are known and a material having the necessary parameters indicated above is found without difficulty.

The letter $e_o$ denotes here and elsewhere in the specification the permittivity of vacuum, $e_o = 8.85 \times 10^{-14}$ F/cm. All numerical values are indicated in the MKSA system of units (Giorgi).

The body of the selected dielectric material must satisfy the formula $$S = A \cdot \frac{C}{e_s}$$

Due to the mechanical rigidity of the selected material and to its workability it is suitable to choose for instance $A = 0.2$ mm., so that the necessary cross-sectional area of the body will be $S = 181$ mm.$^2$, that means the body may be, for instance, a disk with a diameter of approximately 15 mm. and a thickness of 0.2 mm.

For other values of R and C, for instance, $R = 500$ kilohms, $C = 200$ nanofarads, the suitable properties of the dielectric material will be $g_s = 8 \times 10^{-11}$ ohm$^{-1}$cm.$^{-1}$, $e_s = 20000\ e_o$, $e_r = 8\ e_o$, $t = 10^{-1}$ sec., $A = 0.2$ mm., $S = 2.26$ cm.$^2$. The body may be therefore a disk with a diameter of 17 mm. and a thickness of 0.2 mm. An RC series combination with these properties may be used for instance in telephony as a delay line.

Figure 2:
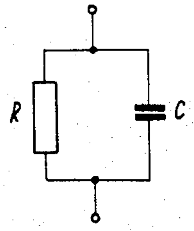

FIG. 2 shows a parallel combination of a resistor R and a capacitor C. In accordance with the invention this combination is replaced by a solid body made of a single dielectric material whose loss factor is greater than 0.1. The dielectric material must have a statical permittivity $e_s$, electrical conductivity $g_s$ and dipole relaxation time $t$ which satisfy the conditions $$\frac{e_s}{g_s} = C \cdot R$$

and $$t \leq \frac{1}{20\pi f_m}$$

where $f_m$ is the highest frequency for which the circuit is to be used, and the thickness A of the body, measured in the direction of the electric field to be applied to it, and the cross-sectional area S of the body measured perpendicularly to the aforesaid direction must satisfy the condition $$S=\frac{A}{R\cdot g_s}$$

The desired values may be $R=150$ ohms, $C=50$ microfarads, $f_m=6$ kc./s. Such parallel combinations are used in cathode circuits of electron tubes in amplifier stages. Up to now electrolytic condensers were commonly used for this purpose. According to the invention it is possible to replace this combination by a disk of a single dielectric material, for instance, of a mixed ferrite, having $e_s=670000$ $e_o$, $g_s=7.9\times10^{-6}$ ohm$^{-1}$cm.$^{-1}$, $t=2\times10^{6}$ sec., $A=0.2$ mm., $S=16.9$ cm.$^2$.

Parallel combinations of R and C members as shown in FIG. 2 are further used in detection circuits of stereo super-heterodyne receivers, the desired values of R and C being for instance $R=47$ kilohms, $C=100$ picofarads, $f_m=10$ kc./s. The following values will satisfy these conditions: $e_s=11500$ $e_o$, $g_s=2.19\times10^{-4}$ ohm$^{-1}$cm.$^{-1}$, $t=1.2\times10^{-6}$ sec., $A=2$ mm., $S=2$ mm.$^2$.

Figure 3:
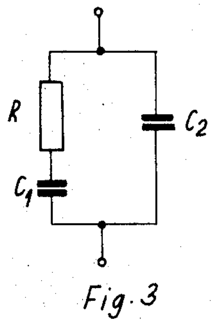

FIG. 3 shows a parallel combination of two elements, the first element being a capacitor $C_2$ and the second element being a series connection of a resistor R and a capacitor $C_1$. In accordance with the invention this combination is replaced by a solid body made of a single dielectric material whose loss factor is greater than 0.1. The dielectric material has an electrical conductivity $g_s$, statical permittivity $e_s$, optical permittivity $e_r$, and dipole relaxation time $t$ which satisfy the conditions $g_s\leq^{-10}$ ohm$^{-1}$cm.$^{-1}$, $$\frac{e_s}{e_r}=1+\frac{C_1}{C_2}$$

$t=R\cdot C_1$, and the thickness A of the body, measured in the direction of the electric field to be applied to it, and the cross-sectional area S of the body measured perpendicularly to the aforesaid direction satisfy the condition $$S=A\cdot\frac{C_1+C_2}{e_s}$$

Such combinations are used in television receivers where the desired values may be for instance $C_1=3$ nanofarads, $R=1$ kilohm, $C_2=500$ picofarads. According to the invention it is possible to replace such a combination by a body of a single dielectric material, for instance, of barium titanate, having $g_s=10^{-10}$ ohm$^{-1}$cm.$^{-1}$, $e_s=2000$ $e_o$, $e_r=285$ $e_o$, $t=3\times10^{-6}$ sec., $A=0.2$ mm., $S=40$ mm.$^2$.

Figure 4:
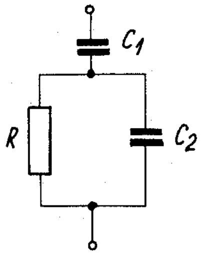

FIG. 4 shows a series combination of two elements, the first element being a capacitor $C_1$ and the second element being a parallel combination of a resistor R and a capacitor $C_2$. In accordance with the invention this combination is replaced by a solid body of a single dielectric material whose loss factor is greater than 0.1. The dielectric material has an electrical conductivity $g_s$, statical permittivity $e_s$, optical permittivity $e_r$, and dipole relaxation time $t$ which satisfy the conditions $g_s\leq10^{-8}$ ohm$^{-1}$cm.$^{-1}$, $$\frac{e_s}{e_r}=1+\frac{C_1}{C_2}$$

$t=R\cdot(C_1+C_2)$, and the body of this selected material has a thickness A measured in the direction of the electric field to be applied to it, and a cross-sectional area S measured perpendicularly to the aforesaid direction to satisfy the condition $$S=A\cdot\frac{C_1}{e_s}$$

Such combinations are used in television receivers and the desired values may be for instance $C_1=120$ picofarads, $R=0.22$ megohm, $C_2=150$ picofarads. According to the invention it is possible to replace such a combination by a body of a single dielectric material, for instance, of ceramic material, having $g_s=10^{-9}$ ohm$^{-1}$cm.$^{-1}$, $e_s=5.5$ $e_o$, $e_r=3$ $e_o$, $t=6.77\times10^{-5}$ sec, $A=0.2$ mm., $S=5$ cm.$^2$.

Figure 5:
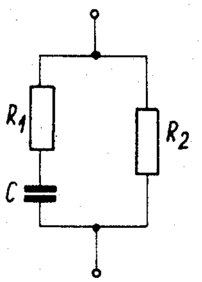

FIG. 5 shows a parallel combination of two elements, the first element being a resistor $R_2$ and the second element being a series connection of a resistor $R_1$ and a capacitor $C_1$. In accordance with the invention this combination is replaced by a solid body made of a single dielectric material whose loss factor is greater than 0.1. The dielectric material has an electrical conductivity $g_s$, optical conductivity $g_r$, and dipole relaxation time $t$ to satisfy the conditions $$\frac{g_r}{g_s}=1+\frac{R_2}{R_1}$$

$t=R_1\cdot C$, and the body has a thickness A, measured in the direction of the electric field to be applied to it, and a cross-sectional area S measured perpendicularly to the aforesaid direction to satisfy the condition $$S=\frac{A}{R_2 g_s}$$

Such combinations are used in correcting circuits of pickups and the desired values may be, for instance $R_1=330$ kilohms, $R_2=2.2$ megohms, and $C=22$ picofarads. According to the invention the combination may be replaced by a body of ferrite, having $g_s=2.27\times10^{-6}$ ohm$^{-1}$cm.$^{-1}$, $g_r=1.74\times10^{-5}$ ohm$^{-1}$cm.$^{-1}$, $t=7.26\times10^{-6}$ sec., $A=0.5$ mm., $S=1$ mm.$^2$.

Figure 6:
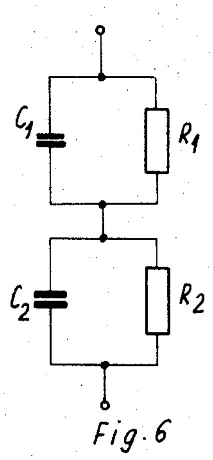

FIG. 6 shows a series combination of two elements, the first element being a parallel connection of a resistor $R_1$ and a capacitor $C_1$ and the second element being a parallel connection of a resistor $R_2$ and a capacitor $C_2$. In accordance with the invention this combination is replaced by a solid body of a single dielectric material whose loss factor is greater than 0.1. The dielectric material has an optical conductivity $g_r$, electrical conductivity $g_s$, optical permittivity $e_r$, and dipole relaxation time $t$ which satisfy the conditions $$\frac{g_r}{g_s}=\frac{(C_1^2R_1+C_2^2R_2)(R_1+R_2)}{R_1R_2(C_1+C_2)^2}$$

$$\frac{g_s}{e_r}=\frac{C_1+C_2}{C_1C_2(R_1+R_2)},\quad t=\frac{R_1R_2(C_1+C_2)}{R_1+R_2}$$

and the body having a thickness A measured in the direction of the electric field to be applied to it, and a cross-sectional area S of the body measured perpendicularly to the aforesaid direction which satisfy the condition $$S=\frac{A}{g_s(R_1+R_2)}$$

Such combinations occur in electric filters, the desired values being, for instance, $R_1=1.5$ megohms, $C_1=10$ nanofarads, $R_2=1$ kilohm, $C_2=2$ microfarads. According to the invention such a combination may be replaced by a single body of spinel or of barium titanate, having $g_r=1.1\times10^{-5}$ ohm$^{-1}$cm.$^{-1}$, $g_s=1.07\times10^{-8}$ ohm$^{-1}$cm.$^{-1}$, $e_r=300$ $e_o$, $t=1.2\times10^{-5}$ sec., $A=0.2$ mm., $S=1.25$ cm.$^2$.

Figure 7:
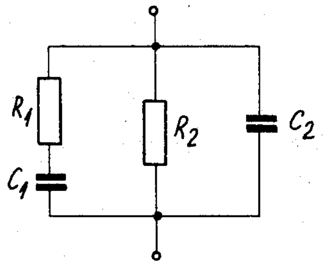

FIG. 7 shows a parallel combination of three elements, the first element being a resistor $R_2$, the second being a capacitor $C_2$ and the third being a series connection of a resistor $R_1$ and a capacitor $C_1$. In accordance with the invention this combination is replaced by a solid body of a single dielectric material whose loss factor is greater than 0.1. The dielectric material has an optical conductivity $g_r$, electrical conductivity $g_s$, optical permittivity $e_r$, and dipole relaxation time $t$ to satisfy the conditions $$\frac{g_r}{g_s}=1+\frac{R_2}{R_1},\quad \frac{e_r}{g_s}=R_2\cdot C_2$$

$t=R_1\cdot C_1$, and the thickness A of the body, measured in the direction of the electric field to be applied to it, and the cross-sectional area S of the body measured perpendicularly to the aforesaid direction satisfy the condition $$S=\frac{A}{g_s \cdot R_2}$$

Such combinations are used in cathode circuits of electron tubes in video amplifiers of television receivers, where the desired values may be for instance $R_1=47$ ohms, $C_1=5$ nanofarads, $R_2=47$ ohms, $C_2=2$ nanofarads. According to the invention such combination may be replaced by a body of spinel, having $g_r=5.6\times10^{-4}$ ohm$^{-1}$cm.$^{-1}$, $g_s=2.8\times10^{-4}$ ohm$^{-1}$cm.$^{-1}$, $e_r=300\ e_o$, $t=2.35\times10^{-7}$ sec., $A=0.2$ mm., $S=1.52$ cm.$^2$.

Figure 8:
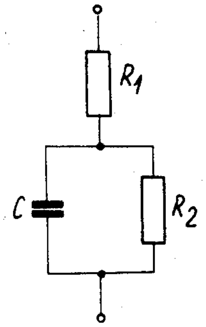

FIG. 8 shows a series combination of two elements, the first element being a resistor $R_1$ and the second element being a parallel connection of a resistor $R_2$ and a capacitor C. In accordance with the invention this combination is replaced by a solid body of a single dielectric material whose loss factor is greater than 0.1. The dielectric material has an optical conductivity $g_r$, electrical conductivity $g_s$, and dipole relaxation time $t$ which satisfy the conditions $$\frac{g_r}{g_s}=1+\frac{R_2}{R_1},\ t=C\cdot\frac{R_1R_2}{R_1+R_2}$$

and the thickness A of the body, measured in the direction of the electric field to be applied to it, and the cross-sectional area S of the body measured perpendicularly to the aforesaid direction satisfy the condition $$S=\frac{A}{g_s(R_1+R_2)}$$

Such combinations occur in cathode circuits of television receivers and the desired values may be, for instance, $R_1=33$ ohms, $R_2=180$ ohms, $C=3300$ picofarads. According to the invention such a combination may be replaced by a body of a single dielectric material, having $g_r=1.26\times10^{-1}$ ohm$^{-1}$cm.$^{-1}$, $g_s=2\times10^{-2}$ ohm$^{-1}$cm.$^{-1}$, $t=9.23\times10^{-8}$ sec., $A=0.5$ mm., $S=1.2$ mm.$^2$.

FIG. 9 shows a parallel combination of more than two elements, the first element being a capacitor C and each of the other elements being a series connection of a resistor $R_1$, $R_2$, etc., and a capacitor $C_1$, $C_2$, etc. Although only two such elements $R_1$, $C_1$ and $R_2$, $C_2$ are shown in FIG. 9, there may be in general $n$ such elements $R_i$, $C_i$ ($n=1, 2, \ldots n$) the whole parallel combination comprising then $n+1$ elements (including the capacitor C). In accordance with the invention this combination is replaced by a solid body made of a single dielectric material with a loss factor greater than 0.1 and with $n$ relaxation times $t_i$ ($i=1, \ldots n$). The dielectric material has an optical permittivity $e_r$, statical permittivity $e_s$, optical conductivity $g_r$, and dipole relaxation times $t_i$ $$(i=1, \ldots n)$$

which satisfy the conditions $$\frac{e_s}{e_r}=\frac{1}{C}(C_1+C \ldots +C_n),\ \frac{e_r}{g_r}=\frac{C}{\frac{1}{R_1}+\cdots\frac{1}{R_n}}$$

$t_i=R_i\cdot C_i$ ($i=1, \ldots n$), and the thickness A of the body, measured in the direction of the electric field to be applied to it, and the cross-sectional area S of the body measured perpendicularly to the aforesaid direction satisfy the condition $$S=A\cdot\frac{C}{e_r}$$

Such combinations are used in filtering circuits, the desired values being for instance $C=50$ picofarads, $R_1=1$ kilohm, $C_1=230$ picofarads, $R_2=2.5$ megohms, $C_2=3000$ picofarads. According to the invention such combination may be replaced by a body of a ferroelectric material having two types of dipoles, and properties of $e_r=300\ e_o$, $e_s=19500\ e_o$, $g_r=5.26\times10^{-4}$ ohm$^{-1}$cm.$^{-1}$, $t_1=2.3\times10^{-7}$ sec., $t_2=7.5\times10^{-3}$ sec., $A=0.2$ mm., $S=3.8$ mm.$^2$.

FIG. 10 shows a parallel combination of two elements, each of which is a series connection of a resistor $R_1$ or $R_2$ and a capacitor $C_1$ or $C_2$, respectively. Although only two such elements $R_1$, $C_1$ and $R_2$, $C_2$ are shown in the drawing, there may be generally $n$ such elements $R_i$, $C_i$ (i=1, 2, . . . $n$). In accordance with the invention this combination is replaced by a solid body of a single dielectric material with a loss factor greater than 0.1 and with $n$ relaxation times $t_i$ ($i=1, \ldots n$). The dielectric material has an optical permittivity $e_r$, statical permittivity $e_s$, optical conductivity $g_r$, and dipole relaxation times $t_i$ ($i=1, \ldots n$) satisfy the conditions $$e_r\leq0.001e_z,\ \frac{e_s}{g_r}=\frac{C_1+\cdots+C_n}{\frac{1}{R_1}+\cdots+\frac{1}{R_n}}$$

$t_i=R_i\cdot C_i$ ($i=1, \ldots n$), and the thickness A of the body, measured in the direction of the electric field to be applied to it, and the cross-sectional area S of the body measured perpendicularly to the aforesaid direction satisfy the condition $$S=\frac{A}{g_r}\left(\frac{1}{R_1}+\cdots+\frac{1}{R_n}\right)$$

Such combinations are used in filtering circuits and the desired values may be, for instance, $C_1=5$ nanofarads, $R_1=1$ kilohm, $C_2=150$ nanofarads, $R_2=0.2$ megohm. According to the invention such a combination may be replaced by a body of a mixed ferroelectric material with two types of dipoles, having $e_r=300\ e_o$, $e_s=54700\ e_o$, $g_r=3.13\times10^{-5}$ ohm$^{-1}$cm.$^{-1}$, $t_1=5\times10^{-6}$ sec., $$t_2=3\times10^{-2}$$

sec.

Bodies of dielectric materials may be placed into a magnetic field generated by an induction element. This arrangement is shown diagrammatically in FIGS. 11 and 12. Bodies 11 and 12 of dielectric materials with a high loss-factor have conductive coatings 13, 14, 15 and 16 on their opposite surfaces. These coatings are shown with exaggerated thickness in FIG. 11. The conductive coatings 14, 15 of the two bodies 11 and 12 contact each other directly. The outer coatings 13, 16 of these bodies are connected by leads 17, 18 to a power source (not shown). Parallel to bodies 11, 12 is connected a winding 20 over a tapping 19, the winding 20 generating a magnetic field which surrounds the bodies 11 and 12. By this arrangement it is possible to utilize not only the permittivity of the bodies 11 and 12 but also their permeability and the frequency response of their permittivities and permeabilities. In addition to winding 20 it is possible to arrange a further winding, not shown in the drawing, serving to adjust the intensity of the magnetic field independently of the magnetic field generated by the winding 20.

Single bodies of high loss-factor dielectric materials may have the shape of flat plates or prisms, as shown in FIG. 13, or a cylindrical shape, as shown in FIG. 14, or other shapes.

Body 21 in the shape of a flat plate, shown in FIG. 13, has conductive coatings 22 on its two opposite surfaces. These coatings do not cover the whole area of the opposite surfaces of body 21 and do not reach its borders. For this reason, only the coating 22 on the upper surface of this body is visible in FIG. 13.

Body 23 of cylindrical shape, shown in FIG. 14, has on its opposite surfaces conductive coatings 24, 25 covering the whole area of these parallel surfaces of body 23.

As mentioned, circuits in which at least one combination of resistors and capacitors is replaced according to the invention by a body of a dielectric material of a high loss-factor may contain also bodies consisting of materials with a loss-factor lower than or equal to 0.1, and/or of resistive materials, and/or of semiconductors. Such bodies may also bear conductive coatings on their opposite surfaces and may be assembled side by side and over each other in a mosaic-like manner.

FIG. 15 is a schematic showing of a relatively complicated circuit comprising five resistors $R_{11}$ to $R_{15}$, four capacitors $C_{11}$ to $C_{14}$, and six terminals $S_1$ to $S_6$. FIGS. 16 and 17 show how it is possible to assemble this circuit according to the invention from bodies made of high-loss dielectric materials, low-loss dielectric materials, and resistance materials. The parallel combination of resistor $R_{14}$ and capacitor $C_{14}$ is replaced according to the invention by a body 31 of a single high-loss dielectric material, as was explained with reference to FIG. 2. Capacitor $C_{11}$ is replaced by a body 32 of a low-loss dielectric material. Similarly, capacitor $C_{12}$ is replaced by a body 33, capacitor $C_{13}$ by a body 34, both of low-loss dielectric materials. Resistor $R_{11}$ is replaced by a body 35 made of resistive material. Similarly, resistor $R_{12}$ is replaced by a body 36, resistor $R_{13}$ by a body 37, and resistor $R_{15}$ by a body 38, all made of resistive materials. Terminals $S_1$ to $S_6$ are denoted with the same reference numerals as in FIG. 15. Thick lines 39 between the bodies represent conductive coatings.

As is evident from FIGS. 16 and 17, the bodies of high-loss dielectric materials, of low-loss dielectric materials, and of resistive materials are juxtaposed and superimposed in four layers. The first, lowermost layer consists of bodies 35, 33, and 36, the body 33 protruding into the second and third layers. The second layer consists of bodies 32 and 38 together with body 33 and the third layer consists of bodies 37, 34, and 33. The fourth layer comprises only one body 31. As best seen in FIG. 17, the superimposed bodies have the same square shape in the first, second and third layers, whereas the single body 31 in the fourth layer has an elongated rectangular shape.

FIGS. 18 and 19 show another embodiment of the invention in which two layers of superimposed bodies each have the shape of a flat plate. The first layer, shown in FIG. 18, consists of a central circular disk 40 surrounded by sector-shaped bodies 41, 42, 43, 44, 45, 46, and 47. The second layer, shown in FIG. 19, consists of a central circular disk 48 surrounded by sector-shaped bodies 49 50, 51, 52, and 53. Hatched areas on the surfaces of bodies 40 to 53 represent conductive coatings arranged on each layer in common parallel planes, the coatings on each plane being spaced from each other by not reaching the borders of the associated bodies. Bodies 40 to 53 have conductive coatings not only on their upper surfaces which are visible in FIGS. 18 and 19, but also on their undersides. Therefore, if the layers of FIGS. 18 and 19 are superimposed, as shown in FIG. 20 in side elevation, the bodies 44 and 45 in the lower layer are electrically connected in parallel with body 51 in the upper layer with which they are simultaneously aligned transversely of their common plane, whereas body 41 of the lower layer is connected in series with body 49 in the upper layer, etc. because the superimposed bodies have different shapes.

The aforedescribed specific embodiments of the present invention are only illustrative of the application of the principles thereof. In accordance with these principles, numerous other equivalent and related embodiments may be constructed by those skilled in the art.

I claim:

1. A passive electric circuit for periodic current, comprising, in combination:

a plurality of solid bodies of dielectric materials, at least one of said bodies comprising a dielectric material having a dielectric loss factor greater than 0.1 and at least two of said bodies comprising different dielectric materials, each of said bodies having two opposite parallel surfaces, said bodies being arranged in a plurality of layers, at least one of said layers including more than one of said bodies, the bodies of said one layer being juxtaposed, one parallel surface of each body in said one layer facing a corresponding surface of a body in another layer; and a conductive coating on said one parallel surface of each body in said one layer and said corresponding surface, each of said conductive coatings on said bodies of said one layer conductively contacting said coating on said corresponding surface.

2. A circuit as set forth in claim 1, wherein said surfaces of said bodies in said one layer extend substantially in a common plane, and the coatings on said bodies of said one layer are spaced from each other in said plane.

3. A circuit as set forth in claim 2, wherein said other layer includes one of said bodies simultaneously aligned with two of said bodies in said one layer transversely of said plane, a conductive coating on said corresponding face of said body in said other layer simultaneously contacting respective coatings on said two bodies in said one layer.

References Cited

UNITED STATES PATENTS

| | | | |
|---|---|---|---|
| 2,769,867 | 11/1956 | Crownover | 179—110 |
| 2,927,285 | 3/1960 | Curran | 333—72 |
| 2,566,666 | 9/1951 | Khouri | 323—74 |
| 2,665,376 | 1/1954 | Kodama. | |
| 2,694,185 | 11/1954 | Kodama. | |
| 2,828,454 | 3/1958 | Khouri | 317—242 |
| 2,877,389 | 3/1959 | Wiener. | |
| 2,940,035 | 6/1960 | Lefkowitz | 323—74 |
| 3,109,983 | 11/1963 | Copper et al. | 323—74 |
| 3,289,276 | 12/1966 | Wasyluk | 29—155.5 |

OTHER REFERENCES

Charles Hager "Network Micro-Circuits" published in Electronics, vol. 32, No. 36, pp. 44–49, Sept. 4, 1959.

A. B. Smith "Printed R–C Networks" published in Electrical Manufacturing, vol. 58, No. 5, November 1956, pp. 121–125.

HERMAN KARL SAALBACH, *Primary Examiner.*

C. BARAFF, *Assistant Examiner.*